May 26, 1931. H. S. BROWN 1,807,148
EARTH AUGER
Filed April 3, 1926
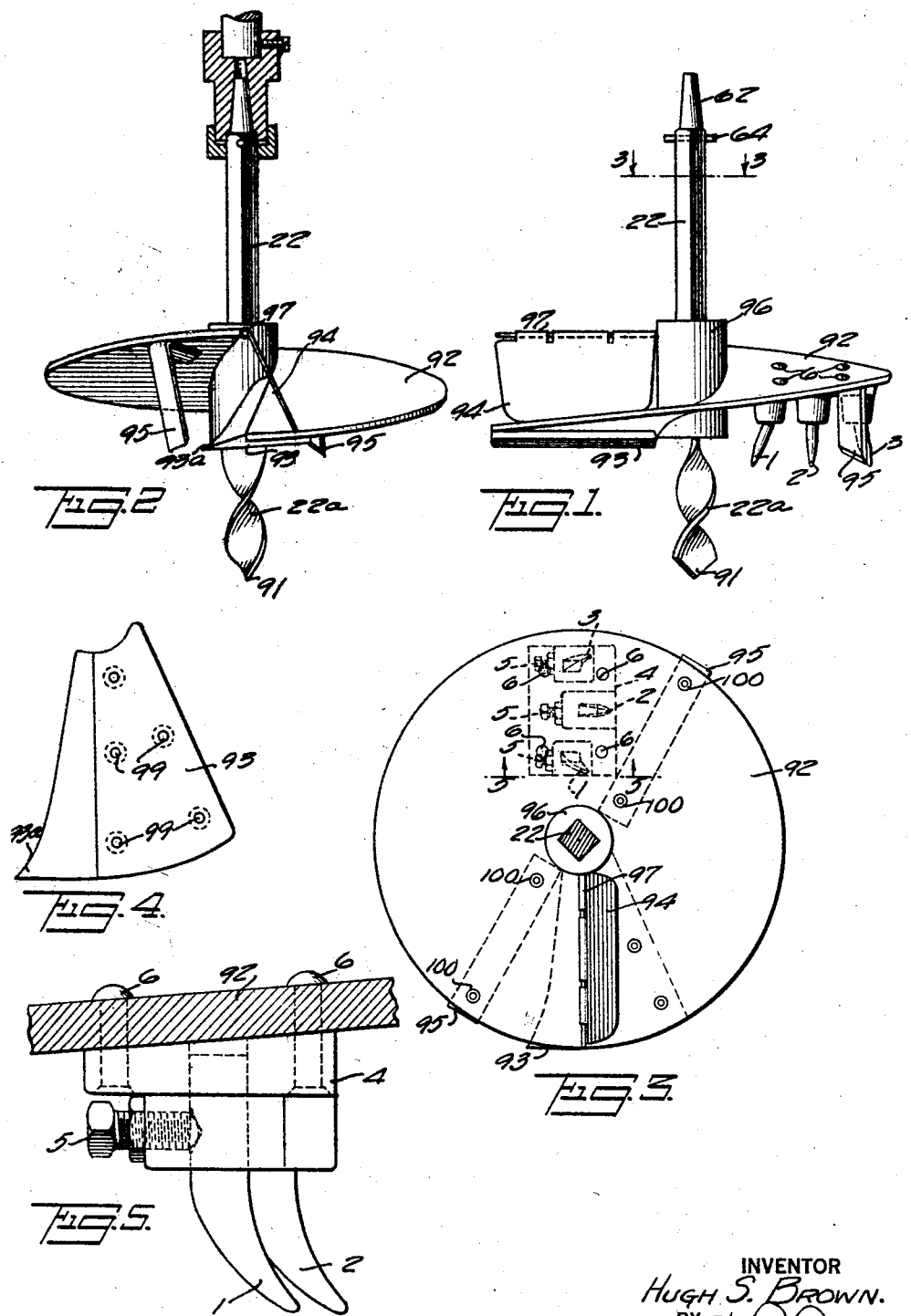
INVENTOR
HUGH S. BROWN.
BY
ATTORNEY Patented May 26, 1931

1,807,148

UNITED STATES PATENT OFFICE

HUGH STEWART BROWN, OF ROSELLE PARK, NEW JERSEY, ASSIGNOR TO THE HUBRON COMPANY, INC., A CORPORATION OF NEW JERSEY

EARTH AUGER

Application filed April 3, 1926. Serial No. 99,445.

My invention relates generally to apparatus for boring holes in the earth and removing the loosened materials from such holes, and more specifically embodies improved mechanism for boring holes in which are to be set telephone and telegraph poles, fence posts and similar devices.

Primarily the invention herein particularly claimed comprises one convolution of a helix having an exterior diameter equal to the diameter of the desired hole, attached knives for cutting out the earth to be removed, and a series of downwardly projecting teeth for loosening the earth in advance of the knife.

The best form of apparatus at present known to me embodying my invention is illustrated in the accompanying sheet of drawings in which:

Fig. 1 is a side view of the auger.

Fig. 2 is a similar view taken at an angle of 90 degrees to the plane of Fig. 1, the tool holder being also shown, mainly in section, with parts broken away.

Fig. 3 is a horizontal section taken on line 3—3 of Fig. 1.

Fig. 4 is a detail plan view of the main cutting knife, which is removable, and

Fig. 5 is a detail cross section on line 5—5 of Fig. 3.

Throughout the drawings like reference characters indicate the same parts.

22 is the shank of the auger preferably made of polygonal cross section in its main portion (shown as a square in the drawings) to facilitate the rigid mounting thereon of the mold board or main helix 92, and also its rigid connection with the tool holder coupling shown in Fig. 2. This shank 22 has a helical centering portion or screw 22a formed at its lower end and terminating in the centering point 91.

On the polygonal portion of said shank is mounted the main helix 92 by hub 96. Preferably this helix 92 extends only through one complete convolution, as shown. On the lower edge of helix 92 is removably mounted by screws 99, 99, or other means, the substantially horizontal main cutting knife 93, preferably formed of manganese steel. Preferably this knife 93 is fastened to the under surface of the helix 92 and has a front cutting edge of V-shaped cross section, the upper surface of which merges and is in line with the upper surface of helix 92. The knife preferably has a projecting lip 93a at the outer extremity of its cutting edge. On the under side of helix 92 are also removably mounted by screws 100, 100, a plurality of vertically extending slicing knives 95, 95. Two of these knives 95 are shown located 180 degrees apart but one, or more, could be used. Their cutting edges should be in vertical alignment with the outer circumference of the helix 92. A flap 94 is hinged at 97 to the upper rear edge of helix 92 and has its lower edge adapted to rest on the top of said helix to the rear of the cutting knife 93 when the auger is not being revolved and forced into the earth, but adapted to swing up into horizontal position during the revolution of the auger in the boring operation.

An important feature of the invention is the scarifier formed of a plurality of downwardly projecting teeth 1, 2, 3, mounted in a casting or plate 4 which may be fastened by rivets 6, 6, or other means to the under side of helix 92. Preferably these teeth are set in sockets and clamped therein by setscrews 5, 5. These teeth should extend downward to a level slightly below that of knife edge 93a, so that the downward movement of the knife (due to the rotation of the auger) will bring the knife edge in any half a revolution down to the bottom of the mass of earth previously loosened up by the teeth 1, 2 and 3. Obviously this will be accomplished when the ends of the teeth 1, 2 and 3 extend downward far enough as shown in Fig. 1 so that they would lie approximately in the surface of the helix of the moldboard if the same were extended that far, because the screw action of the helical moldboard, when the auger is revolved, will normally cause it to advance that distance in each one-half revolution. The outer teeth of the series may also be given an outward twist or inclination, as best shown in Fig. 1. This causes them to slide under the surface of the ground without entirely displacing the earth so loosened, and also gives a wider range of action for a given length of base plate 4. Preferably these scarifier teeth should be set about 180 degrees from knife 93, as shown in Fig. 3.

The operation of the above described apparatus is as follows: When the shank 22 is rotated and helical tip 22a is allowed to rest on the ground, or positively fed downward, said tip 22a first bores a small centering hole, and, subsequently, knives 93 and 95 begin to cut into the earth, knives 95 cutting out a cylindrical core of earth of the same diameter as that of helix 92, scarifier teeth 1, 2 and 3 being set back of one of the slicing knives and breaking up and loosening up this core of earth, and knife 93 separating and lifting said loosened core from the solid earth beneath. The loose body of earth so produced slides up over main helix 92 (flap 94 being forced back thereby) and remains substantially at rest as the auger bores deeper into the solid earth beneath it. When the desired depth has been reached the shank 22 is lifted by any suitable mechanism, not shown, its rotation being preferably stopped or reduced in speed as may be desired, and flap 94 then drops into lowermost position, trapping all the loose earth above helix 92 so that it is all lifted out, leaving the hole clean and empty.

The principal wearing action comes on knives 93 and 95, and scarifier teeth 1, 2, 3, and any of these can be removed and replaced by new ones as they become worn.

Among the more obvious advantages of my invention may be mentioned the following: The slicing knives 95 being quite thin and in line with the outer circumference of main helix 92, the core of loosened earth gradually forced above said helix has a diameter substantially equal to that of the cylindrical hole bored by the auger and does not have to be materially compressed when thus transferred above the helix. The earth is so loosened or torn up by teeth 1, 2, 3, that knife 93 meets little resistance and is not worn out rapidly. This is important as the knife is the most costly element to replace. The teeth, when worn, can be quickly and cheaply replaced by loosening setscrews 5, 5. The helix 92 comprising only one convolution, and the upper edge of knife 93 merging into the upper surface of said helix, the amount of friction on the loose earth in this lifting action is reduced to a minimum, especially as the projecting end lip 93a, and slight inclination of the whole cutting edge shown in Figs. 3 and 4 produce a "drawing" cutting action on the earth. As soon as the loose earth of the core thus formed has been lifted above the helix 92, it remains thereafter stationary, and no power is wasted in agitating it. All this enables the apparatus to operate with a less amount of driving power than is required for other forms of earth augers. When the auger is withdrawn from the completed hole, flap 94 insures all of the loosened earth being lifted with it, and in an uncaked condition so that it can be easily removed from the tool as it rises above the surface of the ground. The removable character of all cutting edges of the tool enables knives of differing character to be employed to suit different kinds of earth, different metals and alloys having unexplainable variations of wearing qualities when employed on different kinds of soil. The invention, as a whole, has proven so efficient that holes have been bored as rapidly with it on a consumption of six horse power, as with a consumption of fifty horse power required for boring holes of the same size in the same kind of earth with competing machines now on the market.

While the best results have been obtained by the combination of all the features of construction herein described and illustrated, obviously various of the noted advantages could be secured by using some of said features with or without substitutes for others, and various modifications in details may consequently be possible without discarding all of the benefits resulting from the use of the entire preferred form shown in the drawings.

Having described my invention, I claim:

1. An earth auger having in combination, a helical mold-board of at least one helical convolution, a cutting knife mounted on the lower edge of said helical mold-board, and a series of scarifier teeth mounted on the under side of said mold-board and pointing downward to an extent such that they project below the level of the knife edge to points which would lie approximately in the surface of the helical moldboard, if it were extended that far.

2. A structure such as defined in claim 1 combined with a vertical knife mounted on the circumference of said mold-board slightly in advance of said teeth and projecting downward to substantially the same extent as they.

3. An earth auger comprising, in combination, a helical mold board extending throughout substantially one convolution of the helix, a knife attached to and along the entire outer edge of said mold board from center to circumference of the helix, a series of teeth attached to the outer surface of said mold board at a point remote from said knife, located approximately along a radius of the helix and projecting substantially at right angles from the mold board surface, and a slicing knife projecting from the outer edge of said mold board and parallel to the axis of the helix at a point in advance of said teeth; whereby said slicing knife may cut out a cylindrical core of earth which is thereafter broken up by said teeth preparatory for subsequent lifting of said loosened earth by the first mentioned knife and mold board.

4. A combination such as defined in claim 3 in which said teeth are fastened to said mold board by detachable means.

HUGH STEWART BROWN.